(12) United States Patent
Tanase et al.

(10) Patent No.: US 11,134,659 B2
(45) Date of Patent: Oct. 5, 2021

(54) LIGHT UNIT FOR COUNTING SEA LICE

(71) Applicant: SIGNIFY HOLDING B.V., Eindhoven (NL)

(72) Inventors: Cristina Tanase, Waalre (NL); Cornelis Teunissen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 3 days.

(21) Appl. No.: 15/545,342

(22) PCT Filed: Jan. 21, 2016

(86) PCT No.: PCT/EP2016/051182
§ 371 (c)(1),
(2) Date: Jul. 21, 2017

(87) PCT Pub. No.: WO2016/116533
PCT Pub. Date: Jul. 28, 2016

(65) Prior Publication Data
US 2018/0000055 A1 Jan. 4, 2018

(30) Foreign Application Priority Data
Jan. 22, 2015 (EP) .................................... 15152139

(51) Int. Cl.
*H04N 7/18* (2006.01)
*A01K 61/13* (2017.01)
*A01K 61/95* (2017.01)
*A01K 63/06* (2006.01)
*A01K 61/90* (2017.01)
(Continued)

(52) U.S. Cl.
CPC .............. *A01K 61/13* (2017.01); *A01K 61/90* (2017.01); *A01K 61/95* (2017.01); *A01K 63/06* (2013.01); *G06K 9/0063* (2013.01); *H04N 5/2256* (2013.01)

(58) Field of Classification Search
USPC ......... 348/89, 92, 61, 64, 38, 73, 79, 81, 82
See application file for complete search history.

(56) References Cited

U.S. PATENT DOCUMENTS 8,405,299 B2 * 3/2013 Toda .................. H05B 33/0857
313/485
9,066,404 B2 * 6/2015 Paolini ............... G06Q 30/0641
(Continued)

FOREIGN PATENT DOCUMENTS

EP 2559336 A1 2/2013

OTHER PUBLICATIONS

Tillett, R.D., et al., "An Optical Method for the Detection of Sea Lice, Lepeophtheirus Salmonis," Aquacultural Engineering 21 (1999) 4 Pages).

*Primary Examiner* — Daquan Zhao

(57) ABSTRACT

The present disclosure proposes an improved apparatus and method for counting of sea lice by providing a stable and controlled light environment which ensures counting of sea lice reliably and independent of weather conditions and an optimized spectral power distribution and intensity of the light for improved observation (detectability) of sea lice with respect to fish skin. An embodiment of the disclosed light system comprises multiple LEDs, at least two LEDs providing a light colour with peaks in the range 490-540 nm (Cyan/Green) respectively 620-660 nm (Red).

19 Claims, 3 Drawing Sheets

(51) Int. Cl.
　　　*A62B 1/04*　　　(2006.01)
　　　*A61B 1/06*　　　(2006.01)
　　　*G06K 9/00*　　　(2006.01)
　　　*H04N 5/225*　　(2006.01)

(56) References Cited

U.S. PATENT DOCUMENTS

| | | | |
|---|---|---|---|
| 9,370,072 B2* | 6/2016 | Zukauskas | H05B 33/0857 |
| 2008/0106887 A1* | 5/2008 | Salsbury | F21K 9/64 |
| | | | 362/84 |
| 2013/0273599 A1* | 10/2013 | Robitaille | A01K 61/00 |
| | | | 435/39 |

* cited by examiner

LIGHT UNIT FOR COUNTING SEA LICE

CROSS-REFERENCE TO PRIOR APPLICATIONS

This application is the U.S. National Phase application under 35 U.S.C. § 371 of International Application No. PCT/EP2016/051182, filed on Jan. 21, 2016, which claims the benefit of European Patent Application No. 15152139.0, filed on Jan. 22, 2015. These applications are hereby incorporated by reference herein.

FIELD OF THE INVENTION

The present invention relates to light systems for use in the aquaculture industry, more specifically the fish farming industry. The disclosed light systems is especially suited for improved observation and counting of sea lice on salmon.

BACKGROUND OF THE INVENTION

Sea lice are small marine parasites that occur naturally on many different species of fish, either wild or cultivated, including cultivated salmon. Sea lice are planktonic and are transported on the tide. When they encounter marine fish they attach themselves, usually on the skin, fins and/or gills and feed on the mucous, blood or skin (FIG. 1). While a few lice on a large salmon may not cause serious damage, large numbers of lice on that same fish, or just a couple of lice on a juvenile salmon, can be harmful or fatal. The feeding activity of sea lice can cause serious fin damage, skin erosion, constant bleeding, and creating pathway for pathogens such as Infectious Salmon Anemia (ISA) disease. An outbreak of ISA on salmon farms in Chile in 2007 spread rapidly from one farm to the next, leading to whole pens and in one case an entire farm's worth of fish having to be destroyed. Sea lice have been identified as a possible factor in the rapid spread of the disease. FIG. 1A shows a picture of sea lice stages that attach to salmon and FIG. 1B shows sea lice attached to fish.

Wherever salmon are farmed, sea lice and salmon are managed in order to ensure the health and well-being of both cultivated and wild fish. There are regulations in place in every country where there is intense salmon aquaculture indicating the maximum allowed amount of sea lice per fish per site and describing the practices and measures to be taken to control the sea lice outbreak. For example in Norway every fish farm site must report on weekly basis to the Health authority the amount of sea lice per fish. In case the maximum allowed sea lice is larger than in the regulation, measures are put in place to reduce sea lice. These measures are either at farm level or at region level and in most of the cases are treatments of fish. Treatments can result in a reduction of feeding in farmed fish, resulting in poorer weight gain and losses for the farm owner.

Therefore early detection and prevention is essential in order to limit extensive and costly treatments.

SUMMARY OF THE INVENTION

Routine monitoring of cultivated fish provides early information as to the presence of sea lice. Accurate counting of lice is important for the aquaculture industry in order to document and control of sea lice.

The monitoring and reporting of sea lice is regulated by each country. For example in Norway the number of salmon lice in a farm must be counted and reported to the Norwegian Food Safety Authority every week at temperatures 4° C. or above and every other week at temperatures below 4° C. The monitoring must be reported from a relevant number of cages on the salmon farm.

Sea lice monitoring is done as following: personnel working at the fish farm collects the fish from sea cage, usually between 10 and 20 fish per cage, puts the fish in anaesthesia and after fish is anesthetised, they count the sea lice on each fish. This takes place in open environment, next to the sea cage, independent of the weather conditions.

The weather conditions and environmental light level at the moment of counting are important factors that impact the observed number of sea lice. At present there is no regulation on the light conditions while counting and large discrepancies are observed between reported and actual number of sea lice.

The present disclosure proposes an improved apparatus and method for counting of sea lice by providing a more stable and controlled light environment which increases the reliability of sea lice count and reduces dependency on weather conditions. The improved apparatus and method include an optimized spectral power distribution and intensity of the light, for improved observation (detectability) of sea lice with respect to fish skin.

A disclosed apparatus comprises of one or multiple light sources for providing a specific spectral power distribution (SPD) for improved observation of sea lice on fish skin. Said SPD is characterized within the visible wavelength range, 380 nm-780 nm, with at least two dominant wavelength peaks, one in the range between 490-540 nm and one in the range between 620-660 nm, where each peak distribution has a typical spectral half-width of 15 nm-35 nm. In a preferred embodiment, the light sources may be LED light sources.

In one example. the one or multiple light sources may be comprised in a single lamp, thereby delivering an application specific lamp with an application specific SPD. For example the lamp may comprise (at least) two light sources wherein a first light source is adapted to provide light output with a dominant wavelength peak in the range between 490-540 nm and second light source is adapted to provide light output with a dominant wavelength peak in the range between 620-660 nm. The intensity of light output by the first light source and the second light source may be controlled individually (e.g. relative to each other thereby controlling the spectral power distribution) and/or in combination (e.g. thereby controlling the overall light output intensity). These controls may be realized by a controller integrated in the lamp adapted to receive a control input from a remote control device for operating the lamp, a network (wired or wireless) to which the lamp is connected, or a user interface (e.g. touch buttons) on the lamp housing or lamp's light emitting surface. In a preferred embodiment, the light sources may be LED light sources and the lamp may be an LED lamp.

In another example, the one or more light sources may be provided as light unit and may be combined into a single light fixture. Next to the light units, the light fixture may comprise additional features such as reflectors, diffusers etc. to mix and diffuse the light output from the one or more light units before it is output by the light fixture. As with the example of the single lamp, the light fixture may comprise (at least) two light units wherein a first light unit is adapted to provide light output with a dominant wavelength peak in the range between 490-540 nm and a second light unit is adapted to provide light output with a dominant wavelength peak in the range between 620-660 nm. The intensity of light output by the first light unit and the second light unit may be controlled individually (e.g. relative to each other thereby controlling the spectral power distribution) and/or in combination (e.g. thereby controlling the overall light output intensity). These controls may be realized by a controller integrated in the light fixture and adapted to receive control input from a remote control device for operating the light fixture, a network (wired or wireless) to which the light fixture is connected, or a user interface (e.g. touch buttons) on the light fixture. In a preferred embodiment, the light units may be LED light units and the light fixture may be a LED fixture.

In a further example, the lamp or fixture may be provided together with a counting box. The counting box may comprise additional features that may increase the effectiveness of the light emitted by the lamp or fixture in the counting of sea lice. For example, the counting box may comprise shading means to reduce entrance of ambient light into the counting box. The counting box may comprise reflecting surface that scatter/diffuse the light from the lamp or light fixture so as to provide further improved homegeneous illumination inside the couting box. The counting box may be an open box with a free entrance for providing samples (fish) into the counting box or it may be a closed box with a door for allowing samples (fish) to be provided in the counting box. The counting box may have an inspection window allowing a user to see through and count the sea lice on the sample inserted in the box. The counting box may also comprise a camera for taking an image of the sample placed in the box, which image may be then be analysed for counting the sea lice. The analysis may be performed either in situ via incorporated image processing software in the camera of the counting box or offline via image processing tools provided on an external computing device capable of receiving the image information from the camera. The counting box may also comprise a display for displaying a field of the view of the camera and/or images taken by the camera. The counting box may comprise a reservoir for receiving an amount of water from the aqueous habitat of the fish being inspected, allowing the fish to further survive when counting the sea lice. The water is not necessarily retrieved directly from the aqueous habitat of the fish but may be an equivalent thereof suitable for the fish to survive when counting the sea lice.

Said SPD can be provided by different means, either by (a combination of) direct LED light (Cyan, Green, Red) or indirect light by using blue LEDs and a remote phosphor or remote phosphor mixture, if necessary combined with filters such as Neodymium filters to create the required dip in spectral power between 540 and 620 nm. Depending on the choice of LED light source(s) and/or the use of phosphor(s) in the LED light unit, a LED light unit may provide light output with one dominant wavelength peak (e.g. in the range between 490-540 nm or in the range between 620-660 nm) or may provide light output with more than one dominant wavelength peak (e.g. at least two dominant wavelength peaks, one in the range between 490-540 nm and one in the range between 620-660 nm).

Said light apparatus may be supplemented with a light sensor. The sensor may read the environmental light conditions and adapt the intensity and/or colour balance (spectral distribution) of light output of the light apparatus in order to provide the optimized light conditions and optimal contrast for counting sea lice. Optionally, also the light output from the light apparatus is monitored using the same or another light sensor. The light sensor(s) allow for (semi-automatically) adjusting the light intensity and/or colour, individually as well as simultaneously.

In an preferred embodiment the light apparatus comprises the following elements:
   at least one LED unit providing a spectral power distribution with at least two peaks, one in the wavelength range 490-540 nm and another in the range 620-660 nm, where each peak distribution has a typical spectral half-width between 15 nm and 35 nm;
   the at least one LED unit is adapted to provide light levels larger or equal to 500 lux as measured on the fish surface, for sufficient detectability of sea lice; and
   at least one LED driver for driving the at least one LED unit.

Another aspect described in the present disclosure is a method for counting sea lice using a light source, a light unit, a light fixture or a counting box according to any of the previous embodiment.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1A:
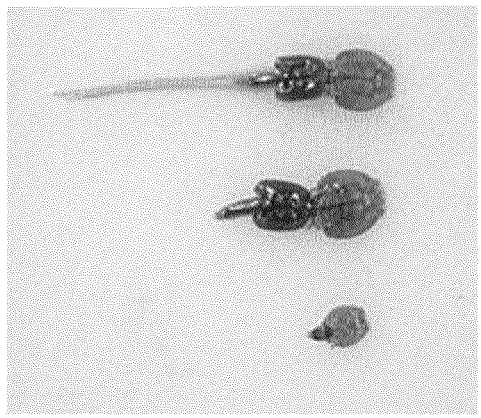
FIG. 1 shows pictures of sea lice in different stages of development and sea lice attached to fish.
Figure 1B:

It should be understood that the Figures are merely schematic and are not drawn to scale. It should also be understood that the same reference numerals are used throughout the Figures to indicate the same or similar parts.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization. For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum. It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, and high-intensity discharge sources (e.g., sodium vapor, mercury vapor, and metal halide lamps).

The term "light fixture" is used herein to refer to an implementation or arrangement of one or more light units in a particular form factor, assembly, or package.

The term "light unit" is used herein to refer to an apparatus including one or more light sources of same or different types. A given light unit may have any one of a variety of mounting arrangements for the light source(s), enclosure/housing arrangements and shapes, and/or electrical and mechanical connection configurations. Additionally, a given light unit optionally may be associated with (e.g., include, be coupled to and/or packaged together with) various other components (e.g., control circuitry) relating to the operation of the light source(s). An "LED-based light unit" refers to a light unit that includes one or more LED-based light sources as discussed above, alone or in combination with other non LED-based light sources. A "multi-channel" light unit refers to an LED-based or non LED-based light unit that includes at least two light sources configured to respectively generate different spectrums of radiation, wherein each different source spectrum may be referred to as a "channel" of the multichannel light unit.

The term "controller" is used herein generally to describe various apparatus relating to the operation of one or more light sources. A controller can be implemented in numerous ways (e.g., such as with dedicated hardware) to perform various functions discussed herein.

A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as random access memory (RAM), programmable read-only memory (PROM), electrically programmable read-only memory (EPROM), electrically erasable and programmable read only memory (EEPROM), floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

An embodiment of the disclosed light system comprises multiple direct LEDs, at least two LEDs providing the light colour with peaks in the range 490-540 nm (Cyan/Green) and 620-660 nm (Red) respectively.

The light system can be mounted in several ways: as a wearable LED light system (e.g. head lamp) with driver integrated, mounted on a support to illuminate the area of interest or integrated in a box where the sea lice on the fish are counted. The box may be closed from all sides except one side.

In all situations the light system can be used inside or outside. The system preferably is water resistant, more preferably at least IP56.

Figure 2A:
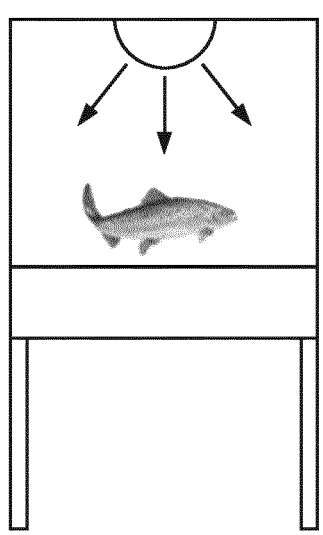
FIG. 2 shows drawings of light systems according to embodiments of the invention.
Figure 2B:
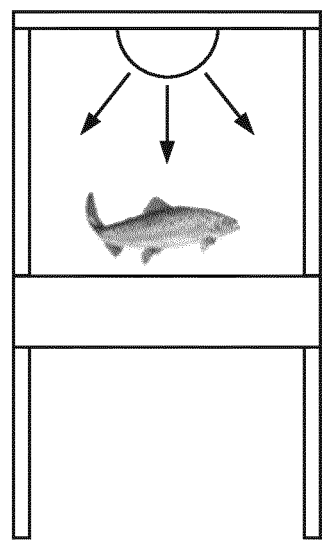

FIG. 2A shows a drawings of light system mounted to a table and FIG. 2B shows a light system mounted in a counting box. The advantage of mounting the LED system in a counting box is that the conditions for counting sea lice are better controlled, i.e. the environmental factors and the environmental light (level) have no or limited influence on the detection of sea lice. The counting box can be supplemented by a light measurement device with or without a semi-automatic control unit for maintaining a minimum or constant illumination level in the box. Said light measuring device can be a lux meter or a photodiode with spectral response characteristics similar to the human eye sensitivity (spectral luminous efficiency) with additional circuitry, e.g. current to voltage conversion. The output of said circuitry can be used to semi-automatically control the light output of said light system.

The inventors have tested the disclosed light device on samples of see lice and/or fish. The evidence regarding the light colour and light intensity to be implemented in the LED system is provided below.

Figure 3A:
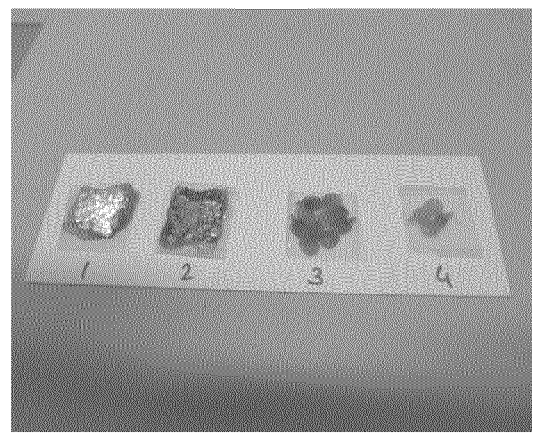
FIG. 3 shows reflection measurement on sea lice and fish skin.
Figure 3B:
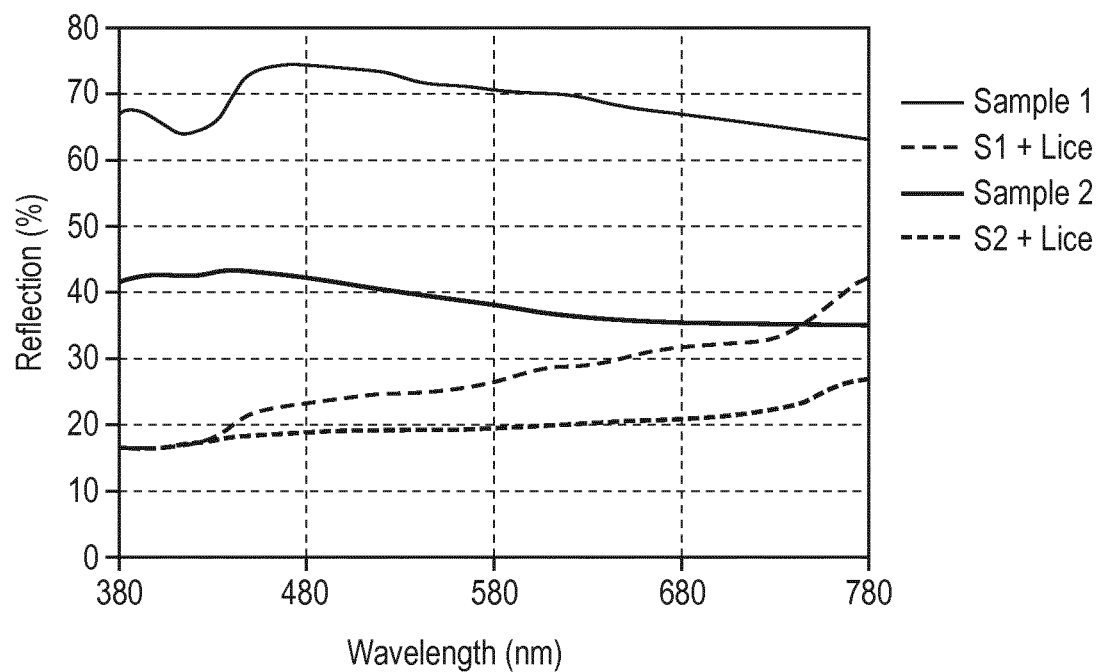

Transmission and reflection measurements have been done on salmon and sea lice; two types of salmon skin with and without sea lice and sea lice separately. Sample 1 is light salmon skin, sample 2 is dark salmon skin, samples 3 and 4 are sea lice. Afterwards sample 1 with sea lice and sample 2 with sea lice have been prepared and measured. In FIG. 3 the measurement results are presented. FIG. 3A shows a picture of the prepared samples and FIG. 3B shows reflection measurements on salmon skin (graphs labelled 'Sample 1' and 'Sample 2') and salmon skin with sea lice (graphs labelled 'S1+Lice' and 'S2+Lice'). The samples with the sea lice (dotted lines) have a higher reflectance factor for the longer (reddish) wavelengths, in particular for the bright parts of the salmon (S1+Lice in FIG. 3B), whereas the salmon skin samples have a slightly lower reflectance factor for longer wavelengths. This different behaviour in reflectance factor for the longer wavelengths is advantageously used to increase the perceived difference between the skin tone rendering with and without sea lice by means of tuning the spectral power distribution of an electric light source.

For evaluating perceived color difference, the inventors used the CIE CAM02 color appearance model published in 2002 by the International Commission on Illumination (CIE) Technical Committee 8-01. Further information on this color appearance model in publically available in the following publications:

M. D. Fairchild, Color Appearance Models, 2nd edition, 2005, Chapter 16 (CIECAM02), John Wiley & Sons Ltd, ISBN 0-470-01216-1.

M. R. Luo, G. Cui, C. Li, Uniform Colour Spaces Based on CIECAM02 Colour Appearance Model, COLOR research and application, Volume 31, Number 4, August 2006, pp 320-330.

C. Li, M. R. Luo, C. Li, G. Cui, The CRI-CAM02UCS Colour Rendering Index, COLOR research and application, Volume 37, Number 3, June 2012, pp 160-167.

For light measurement, a Hamamatsu S7686 Si photodiode can be used in combination with an operational amplifier for converting current to voltage. The higher the output of the sensor, the more light falls onto the sensor and, hence, less light needs to be produced by the light system. Such a light measuring system can also be used, in the salmon evaluation box, to automatically adjust the light system to the correct illumination level. The S7686 has a spectral response characteristic that is more similar to the human eye sensitivity (spectral luminous efficiency) than their conventional visible-compensated sensors (S1133, etc.).

Figure 4:
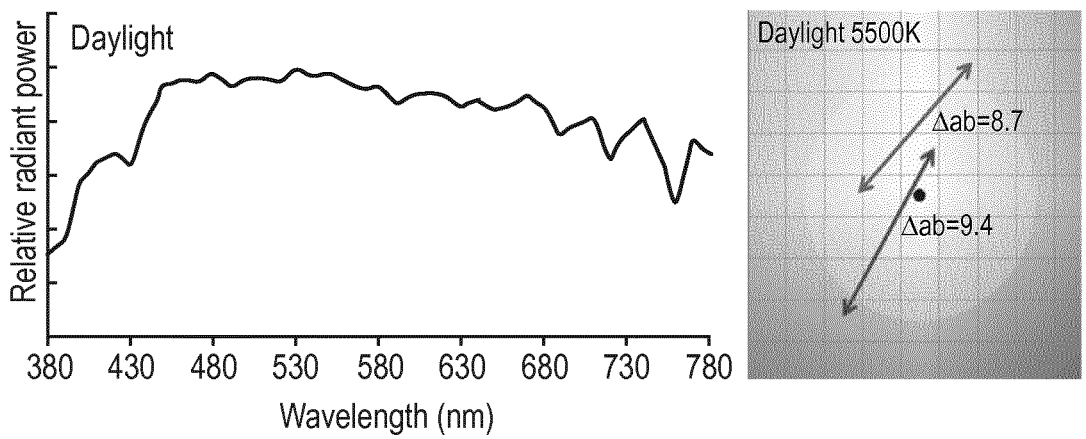
FIG. 4 shows perceived color difference between sea lice and fish skin under daylight illumination conditions.

FIG. 4 shows the perceived colour differences, represented in the CAM02 Uniform Colour Space, between the dark skin with and without sea lice (red arrow) and between the bright skin with and without sea lice (blue arrow) when observed under typical daylight conditions (5500K). On the horizontal axis of the CAM02 diagram (diagram at the right of FIG. 4) the degree of redness-greenness ($a'_M$) is indicated and on the vertical axis the degree of yellowness-blueness ($b'_M$). Aab indicates the colour difference between the skin with and without sea lice. The black dot indicates the (achromatic) origin of the diagram.

Figure 5:
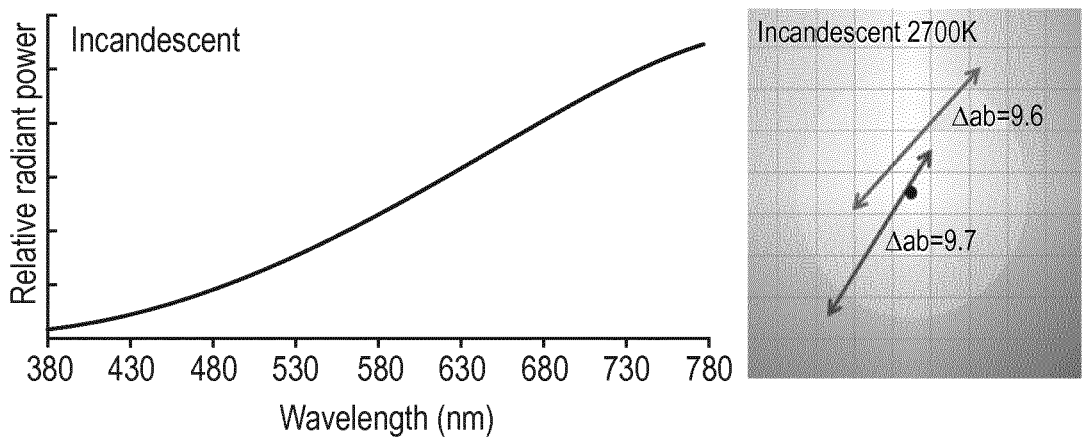
FIG. 5 shows perceived color difference between sea lice and fish skin under incandescent lamp illumination conditions.

FIG. 5 shows the perceived colour differences, represented in the CAM02 Uniform Colour Space, between the dark skin with and without sea lice (red arrow) and between the bright skin with and without sea lice (blue arrow) when observed under typical electric light conditions (incandescent light source with a CCT of 2700K). On the horizontal axis of the CAM02 diagram (diagram at the right of FIG. 5) the degree of redness-greenness ($a'_M$) is indicated and on the vertical axis the degree of yellowness-blueness ($b'_M$). $\Delta$ab indicates the colour difference between the skin with and without sea lice. The black dot indicates the (achromatic) origin of the diagram. The incandescent light source has more energy in the long wavelengths, but it is not a peaked spectrum, i.e. the spectral power gradually increases with increasing wavelength (graph at the left of FIG. 5). Due to the chromatic adaptation ability of the human eye, the perceived colour differences between skin with and without sea lice are similar for these light sources. Typical white LED light sources have similar, or slightly worse, performance on lice detection compared to incandescent light sources.

Figure 6:
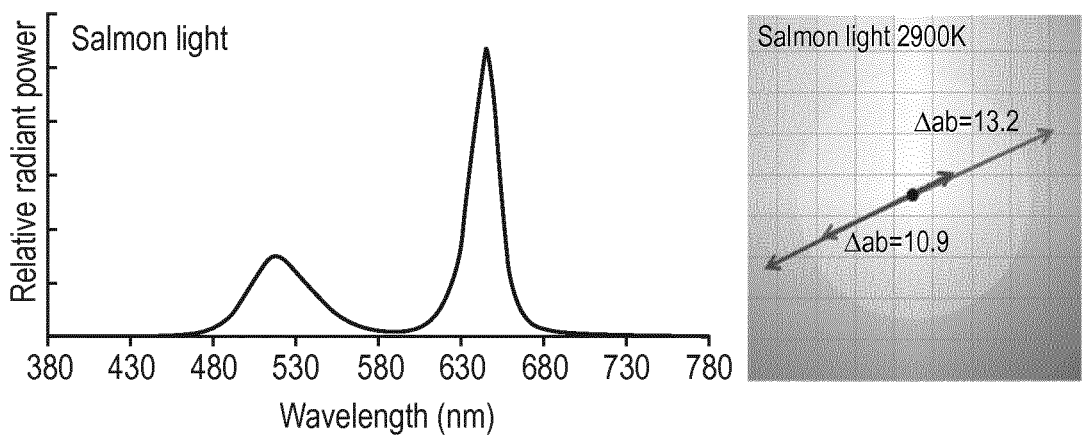
FIG. 6 shows perceived color difference between sea lice and fish skin under illumination conditions according to an embodiment of the invention.

FIG. 6 shows the perceived color differences between skin with and without lice for the dark part (red arrow) and bright part (blue arrow) of the fish when illuminated with a light system according to an embodiment of the invention. A spectral power distribution of light emitted by the light system is illustrated in the graph at the left of FIG. 6. On the horizontal axis of the CAM02 diagram (diagram at the right of FIG. 6) the degree of redness-greenness ($a'_M$) is indicated and on the vertical axis the degree of yellowness-blueness ($b'_M$). Aab indicates the colour difference between the skin with and without sea lice. The black dot indicates the (achromatic) origin of the diagram. In order to increase the perceived colour difference between skin with and without lice, the disclosed light system comprises a spectral power distribution (SPD) having a narrower, more peaked, characteristic in the long wavelengths to make use of the differences in reflectance factors. However, only emitting light in the long wavelengths make both the skin and the lice appear reddish, which does not enhance visibility of the lice. The inventors therefore added a greenish peak (in the range between 490 nm and 540 nm) in combination with the reddish peak (in the range between 620 nm and 660 nm), see graph at the left of FIG. 6, which makes the lice appear more reddish compared to the skin, while the skin colour appears more greenish/blue as illustrated in the CAM02 diagram at the right of FIG. 6. FIG. 6 also clearly shows that the lengths of the colour difference vectors are larger compared to daylight and incandescent light source illumination, indicating larger colour differences between sea lice and skin. Another advantage of this tuned spectrum is that the appearance of the lice on the dark and the bright parts of the skin is similar (overlapping colour difference vectors and both going through the origin of the diagram), which makes detection of lice on different skin parts, dark and bright, easier.

Examples of LEDs that may be used in embodiments of the disclosed light system are LED available from Lumileds with following references:

| | |
|---|---|
| LXML-PD01-00xx | Red (dominant wavelength 620 nm-645 nm) |
| LXML-PM01-0xxx | Green (dominant wavelength 520 nm-540 nm) |
| LXML-PE01-00xx | Cyan (dominant wavelength 490 nm-515 nm) |

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An apparatus for counting sea lice, comprising at least one light source for providing a light output with a spectral power distribution for observation of sea lice, on fish skin, where said spectral power distribution is characterized within the visible wavelength range from 380 nm to 780 nm by at least two dominant wavelength peaks, a first dominant wavelength peak in the range of 490-540 nm and a second dominant wavelength peak in the range of 620-660 nm,
wherein the apparatus further comprises a sensor for measuring an environmental light condition and a processor for adapting an intensity and/or a colour balance of the light output of the light source to the measured environmental light condition for increasing visual contrast when counting sea lice.

2. The apparatus of claim 1, wherein a peak distribution of at least one of the first and the second dominant wavelength peak has a spectral half-width of 15-35 nm.

3. The apparatus of claim 1, wherein the at least one light source is adapted to provide an illuminance larger or equal to 500 lux as measured on a target surface, wherein the target surface is fish skin.

4. The apparatus of claim 1, comprising at least a first light source for providing light output having the first dominant wavelength peak and a second light source for providing light output having the second dominant wavelength peak.

5. The apparatus of claim 1, wherein the light output in at least one dominant wavelength peak is produced via phosphor conversion from light in a UV or blue wavelength range.

6. The apparatus of claim 1, further comprising a light fixture comprising the at least one light source and at least a reflector or diffuser for homogenizing the lighting output from the at least one light source.

7. The apparatus of claim 1 wherein the apparatus is a wearable device.

8. The apparatus of claim 1 wherein the at least one light source is a direct LED or a phosphor converted LED.

9. A method of counting sea lice on skin of a fish sample comprising:
providing a fish sample;
illuminating the fish sample with a light output having a spectral power distribution within the visible wavelength range from 380 nm to 780 nm including at least two dominant wavelength peaks comprising a first dominant wavelength peak in the range of 490-540 nm and a second dominant wavelength peak in the range of 620-660 nm; and
counting the sea lice on skin of the fish sample;
wherein the first dominant wavelength peak and the second dominant wavelength range in said light output.

10. The apparatus of claim 1, further comprising a box for receiving a fish sample comprising said fish skin for and being adapted to support the at least one light source providing the light output for counting the sea lice on the fish skin.

11. The apparatus of claim 10, wherein the box further comprises a camera for taking an image of the fish sample placed in the box and a processor configured to perform an image analysis for counting the sea lice on the fish skin from the image, wherein the processor is in the camera of the counting box or in an external computing device capable of receiving the image from the camera.

12. The apparatus of claim 10, wherein the box further comprises a reservoir for receiving an amount of water from an aqueous habitat of the fish sample such that the fish sample is received in the amount of water and survives when counting the sea lice on the fish skin.

13. The method of claim 9, wherein the counting includes taking an image of the fish sample and analyzing the image to count the sea lice on skin of the fish sample.

14. The method of claim 9, wherein the counting comprises counting the sea lice on different skin tones of fish in the fish sample.

15. The method of claim 9 wherein the second dominant wavelength peak is larger than the first dominant wavelength peak.

16. The method of claim 9 wherein the second dominant wavelength peak is more than twice as large as the first dominant wavelength peak.

17. An apparatus for counting sea lice comprising: at least one light source for providing a light output with a spectral power distribution for observation of sea lice on fish skin, where said spectral power distribution is characterized within the visible wavelength range from 380 nm to 780 nm by at least two dominant wavelength peaks comprising a first dominant wavelength peak in the range of 490-540 nm and a second dominant wavelength peak in the range of 620-660 nm, wherein the first dominant wavelength peak and the second dominant wavelength peak are larger than any other wavelength peak within said visible wavelength range in said light output.

18. The apparatus of claim 17, wherein the second dominant wavelength peak is larger than the first dominant wavelength peak.

19. The apparatus of claim 17, wherein the second dominant wavelength peak is more than twice as large as the first dominant wavelength peak.

* * * * *